(12) United States Patent
Yadegar

(10) Patent No.: US 11,199,093 B2
(45) Date of Patent: Dec. 14, 2021

(54) ARC TURBINE

(71) Applicant: Jerry Iraj Yadegar, Las Vegas, NV (US)

(72) Inventor: Jerry Iraj Yadegar, Las Vegas, NV (US)

(*) Notice: Subject to any disclaimer, the term of this patent is extended or adjusted under 35 U.S.C. 154(b) by 0 days.

(21) Appl. No.: 17/221,799

(22) Filed: Apr. 4, 2021

(65) Prior Publication Data

US 2021/0277780 A1 Sep. 9, 2021

Related U.S. Application Data

(63) Continuation of application No. PCT/US2020/000006, filed on Jan. 21, 2020.
(Continued)

(51) Int. Cl.
*F01C 1/344* (2006.01)
*F02B 53/02* (2006.01)
(Continued)

(52) U.S. Cl.
CPC .......... *F01C 1/3442* (2013.01); *F01C 1/3446* (2013.01); *F01C 21/06* (2013.01);
(Continued)

(58) Field of Classification Search
CPC .. F01C 1/3442; F01C 21/0881; F01C 1/3446; F01C 21/0809; F01C 21/06; F02B 53/02;
(Continued)

(56) References Cited

U.S. PATENT DOCUMENTS

| 129,953 | A | * | 7/1872 | Hawley | .................. | F04C 2/084 |
| | | | | | | 418/77 |
| 872,234 | A | * | 11/1907 | Henry | ..................... | F04C 2/344 |
| | | | | | | 418/237 |

(Continued)

FOREIGN PATENT DOCUMENTS

| CH | 578677 A5 * | 8/1976 | .......... F01C 21/0809 |
| DE | 2807595 A1 * | 8/1979 | ............ F01C 1/3446 |
| JP | 57086587 A * | 5/1982 | .......... F01C 21/0809 |

*Primary Examiner* — Mary Davis

(57) ABSTRACT

An arc turbine system includes an elliptical housing, a rotor having two sliding channels positioned centrically to the housing, and two sliding arcs disposed within the rotor sliding channels and slide therein. The sliding arcs are engaging the housing simultaneously at both ends in a near friction-free environment supported by repulsion force of like-pole magnets. Four chambers disposed within two static chambers between the rotor and the long-axis of said housing, the two static chambers further include proper inlet and outlet ports configured to allow fluid and gas flow into and flow out of the static chambers. The system configured in two distinct settings for two distinct uses. 1) To generate dense rotating energy with optimum efficiency, and high power-to-weight ratio by burning fuel and 2) to pump, compress, vacuum, convey, pressurize, turbocharge, allow precision and micro-movement of gas and liquid, conversion of pressurized gas and liquid to rotating energy, all with optimum efficiency, near-zero vibration, near-zero friction, capability of handling all viscous fluids and 100% increased flow rate using dual inlet and dual outlet ports.

20 Claims, 7 Drawing Sheets

Related U.S. Application Data

(60) Provisional application No. 62/918,262, filed on Jan. 23, 2019.

(51) Int. Cl.
  *H02K 7/18* (2006.01)
  *F01C 21/08* (2006.01)
  *F01C 21/06* (2006.01)

(52) U.S. Cl.
  CPC ...... *F01C 21/0809* (2013.01); *F01C 21/0881* (2013.01); *F02B 53/02* (2013.01); *H02K 7/1892* (2013.01); *F04C 2240/30* (2013.01); *F04C 2240/802* (2013.01)

(58) Field of Classification Search
  CPC .............. H02K 7/1892; F04C 2240/30; F04C 2240/802
  See application file for complete search history.

(56) References Cited

U.S. PATENT DOCUMENTS

| | | | | |
|---|---|---|---|---|
| 1,716,901 | A * | 6/1929 | Rochford | F04C 2/34 418/148 |
| 2,492,868 | A * | 12/1949 | Johnson | F04C 2/344 418/237 |
| 2,952,249 | A * | 9/1960 | Conover, Jr. | F01C 21/0818 418/152 |
| 3,387,565 | A * | 6/1968 | Mezzetta | F01C 1/3446 418/238 |
| 3,989,427 | A * | 11/1976 | Meyer | F01C 1/3446 418/150 |
| 4,225,293 | A * | 9/1980 | Lee | F01C 1/3446 123/243 |
| 5,855,474 | A * | 1/1999 | Shouman | F01C 1/34 418/6 |
| 6,589,033 | B1 * | 7/2003 | Johnson | F01C 11/004 418/13 |
| 2019/0010942 | A1 * | 1/2019 | Patterson | F01C 21/0881 |

* cited by examiner

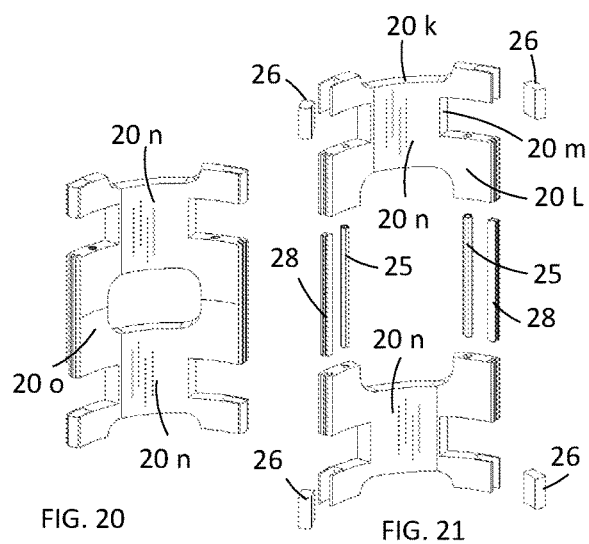
FIG. 20
FIG. 21
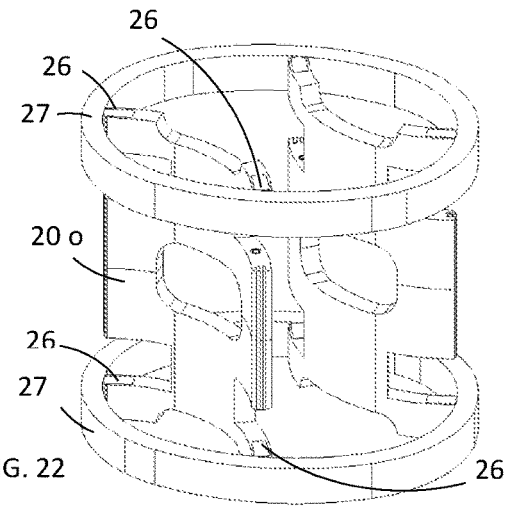
FIG. 22
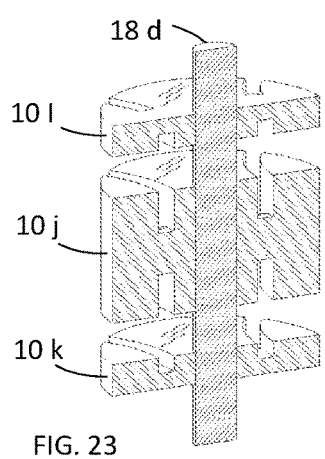
FIG. 23
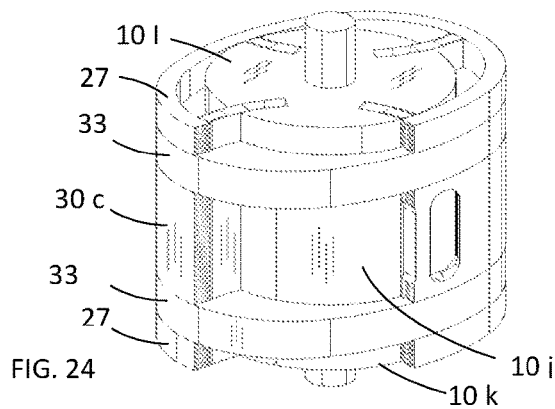
FIG. 24
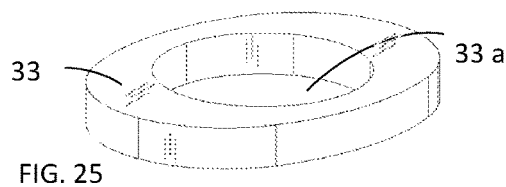
FIG. 25
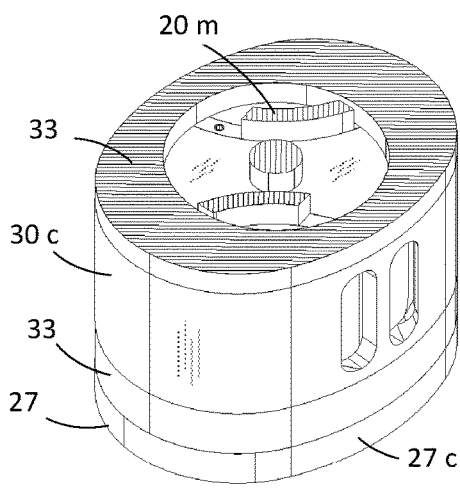
FIG. 26
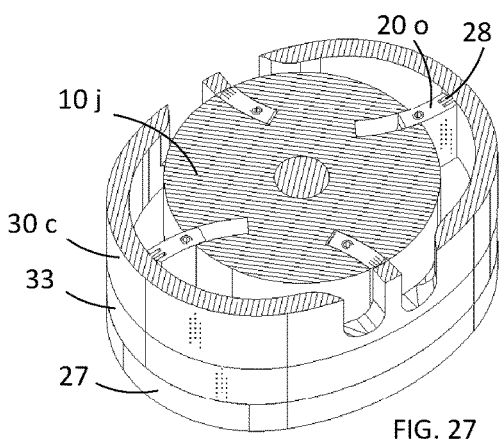
FIG. 27

ARC TURBINE

CROSS-REFERENCE TO RELATED APPLICATIONS

The present invention claims priority to U.S. provisional application Ser. No. 62/918,262 filed on 23 Jan. 2019, and PCT application serial number PCT/US2020/000006 filed on 21 Jan. 2020

BACKGROUND OF THE INVENTION

1. Field of the Invention

The present invention relates to conversion of fuels chemical energy to dense rotating energy at optimum efficiency, and further to improve movement of gases and liquids from point to point with at optimum efficiency, for a wide range of hydraulic and pneumatic applications.

2. Description of Related Art

Dense rotating energy at optimum efficiency is in high demand, but every conventional method proposed to meet the demand, lacks required characteristics to be considered as a viable solution. There are as well, many flaws with pumps, for both gas and liquid, compressors, vacuums, pressurizers and related components, including inefficiency, vibration, friction, cavitation, noise, and poor handling of high viscous fluids. Arc turbine's unique system of operation provides a unique solution to solve those problems in a simple, effective, practical, easy to implement and economical manner.

BRIEF SUMMARY OF THE INVENTION

An arc turbine system includes an elliptical housing, a rotor having two sliding channels placed centrically within the housing, two sliding arcs simultaneously sliding within the sliding channels and reciprocating therein, and proper magnets. The housing and the rotor collectively forming two static chambers in-between the rotor and the housing long-axis, a first static chamber and a second static chamber. The first static chamber includes at least one intake port, and the second static chamber includes at least one exhaust port. The sliding arcs engage the housing simultaneously at both ends within both static chambers and collectively forming four variable capacity rotating chambers. The sliding arcs further include at least one magnet at both ends, and the housing further includes at least one magnet aligned with the housing. The sliding arcs magnets further configured to repel the housing like-pole magnet and avoid friction between the two sliding arcs and the housing.

In one setting, the arc turbine system configured to allow four rotating chambers generate four suction, compression, expansion and exhaust in every rotation with optimum efficiency as the expansion force applied directly to the rim of the rotor.

In another setting, compressed fuel simultaneously entered both static chambers, ignited, and the expansion force applied to two rotating chambers, generating eight expansion force per rotation.

In yet another setting, four rotating chambers powered by an external source, allow movement of gas and liquid simultaneously through both static chambers with 100% increased flow rate, regardless of viscosity, reduced or no cavitation, torque increase in air motors and air tools, and precision and micro-movement of fluids and more.

BRIEF DESCRIPTION OF THE DRAWING FIGURES

The novel features believed characteristic of the embodiments of the present application are set forth in the appended claims. However, the embodiments themselves, and a preferred mode of use, and further objectives and advantages thereof, will best understood by reference to the following detailed description when read in conjunction with the accompanying drawings, wherein:

FIG. 1 shows some basic parts of an arc turbine.
FIG. 2 shows a view of FIG. 1, including inlet and the outlet ports.
FIG. 3 shows four rotating chambers of FIG. 1 rotated about 45°.
FIG. 4 shows an arc turbine system including inlet and outlet ports.
FIG. 5 shows FIG. 2 including two inlet and two outlet ports.
FIG. 6 shows a cross section view as shown in FIG. 5.
FIG. 7 shows a spring, engaging a sliding arc and a rotor.
FIG. 8 shows a sliding arc, including a spring.
FIG. 9 shows a two-piece sliding arc.
FIG. 10 shows a sliding arc, includes sliding enhancement bearing.
FIG. 11 shows a sliding arc engaging a rotor from the rim of said rotor.
FIG. 12 shows the assembly of two sliding arcs.
FIG. 13 shows two sliding arcs engaging a rotor from the rotor's both ends.
FIG. 14 shows a sliding arc includes a magnet.
FIG. 15, shows a rotor with magnets to repel the magnets of an engaging sliding arc.
FIG. 16, shows a hollowed rotor engaging a shaft with passage linked to the hollow.
FIG. 17, shows a rotor storage with outlet ports and engaging shaft with passage.
FIG. 18, shows a sliding arc with magnets at both ends and seals.
FIG. 19. shows magnet of a sliding arc repelling magnets of the engaging housing.
FIG. 20, shows a two-piece sliding arcs assembly, each sliding arc extended into two segments where one segment includes a magnet at both ends.
FIG. 21, shows an exploded view of FIG. 20 parts.
FIG. 22, shows a pair of two-piece sliding arcs magnets repelling two engaging elliptical magnets.
FIG. 23, shows a three-unit assembly of three rotors and an engaging shaft.
FIG. 24, shows an assembly of FIGS. 20-23 parts including thermal insulators.
FIG. 25, shows a thermal insulator.
FIG. 26, shows a thermal insulator and reciprocating limitations of sliding arcs.
FIG. 27, shows friction free reciprocation motion of the sliding arcs within the engaging housing.
FIG. 28, shows suction, compression, ignition, expansion and exhaust occurred within all four rotating chambers.
FIG. 29, shows frequent injection of fuel within one or both static chambers plus the rotor cooling fins.
FIG. 30, shows generation of electricity by reciprocating motion of sliding arcs against an engaging rotor and injection of fuel through the rotor.

Figure 1:
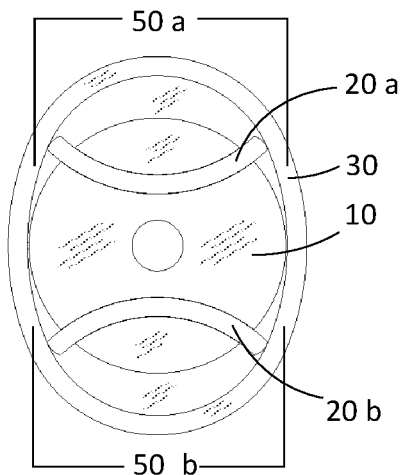
Figure 2:
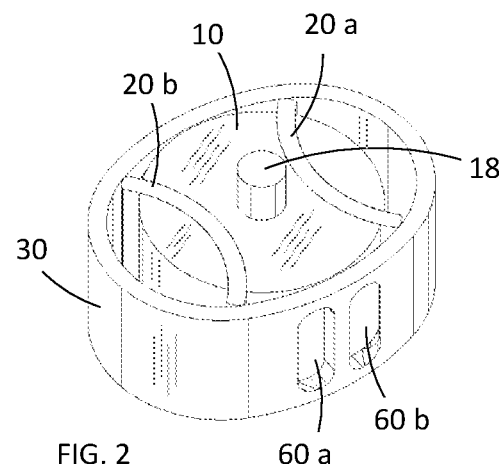
Figure 3:
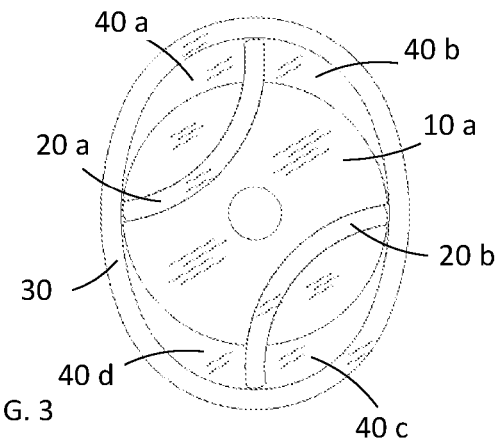
Figure 4:
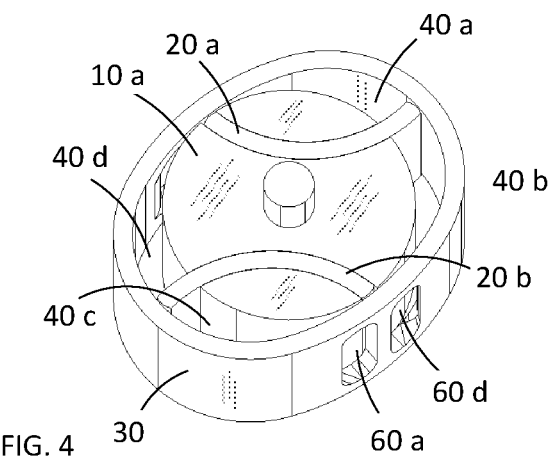
Figure 5:
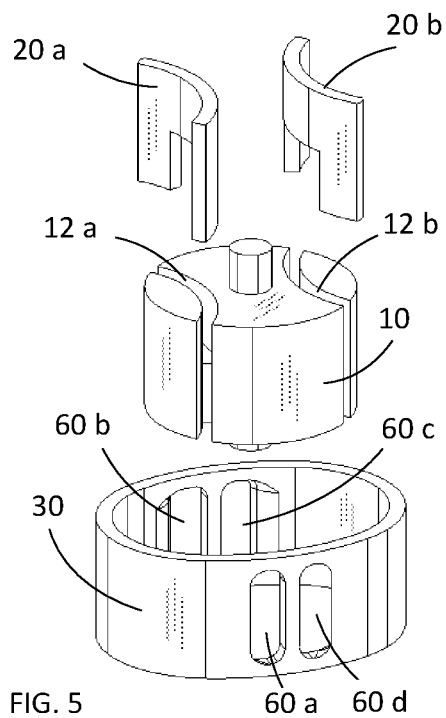
Figure 6:
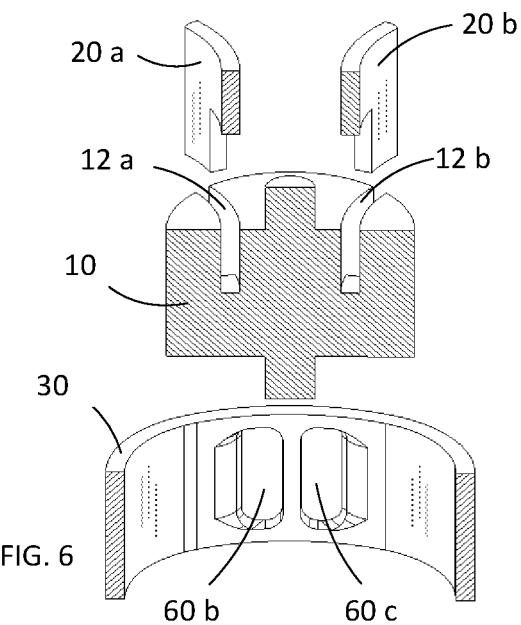

While the system and method of use of the present invention are susceptible to various modifications and alternative forms, specific embodiments thereof have been shown by way of examples in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENT

Illustrative embodiments of the system and methods of use of the present invention are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex, but would nevertheless be a routine undertaking for those of ordinary skill in the art of having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined and/or interchanged with one another, all of which are within the scope of the present invention, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless described otherwise.

The preferred embodiment herein described is not intended to be exhaustive or to limit the invention to the precise form disclosed. It is chosen and described to explain the principles of the invention and its applications and practical uses to enable others skilled in the art to follow its teachings.

Referring now to the drawings wherein reference characters identify corresponding or similar elements throughout the several views, FIGS. 1-33 depicts various embodiments of systems and various methods of use. It should be understood that the embodiments discussed herein are substantially similar in form and function and share one or more of the features discussed in each embodiment, although the features may not be shown specifically concerning the particular embodiment.

An arc turbine, as shown in FIGS. 1-6, includes at least one rotor (10), at least two sliding arcs (20 a) and (20 b), and at least one elliptical housing (30). The rotor (10) slidingly accommodating the sliding arcs (20 a) and (20 b) within proper sliding means including proper sliding channels (12 a) and (12 b). The sliding arcs (20 a) and (20 b) further configured to reciprocate within the sliding channels (12 a) and (12 b) as the rotor (10) is rotating centrically within the housing (30).

Each said sliding arcs (20 a) and (20 b) further configured to engage the housing (30) simultaneously at both ends. The sliding arcs (20 a) and (20 b), the rotor (10), and the housing (30) collectively forming four variable capacity rotating chambers (40 a), (40 b), (40 c), and (40 d) within two static chambers (50 a) and (50 b) between the rotor (10) and the both long-axis of the housing (30). The two static chambers (50 a) and (50 b) further include proper inlet and proper outlet ports (60 a), (60 b), (60 c), and (60 d).

The four rotating chambers (40 a), (40 b), (40 c) and (40 d) within the two static chambers (50 a) and (50 b) further configured to accomplish many tasks for varieties of applications including but not limited to hydraulic, pneumatic, electric, electronic or a combination thereof to pump, vacuum, compress, pressurize, turbocharge, micro-movement, robotic motions, convey, controlled motions and generate electricity using a wide range of pressurized flow means as the rotor (10) rotates by proper rotating means including a rotating shaft (18) powered by a power source and further to generate rotating energy by igniting proper fuel. The rotor (10) is further configured to rotate in both clockwise (CW) and counterclockwise (CCW) directions. Either one or two types of flow further configured to flow simultaneously into and out of the two static chambers (50 a) and (50 b).

Figure 7:
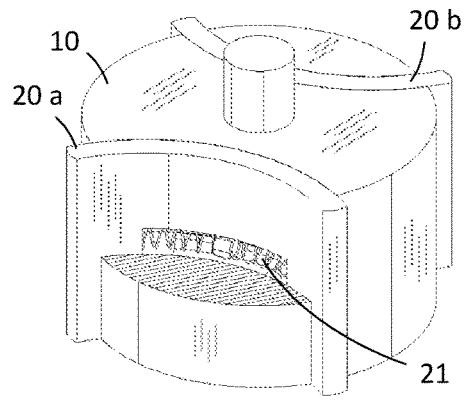

Proper spring means (21) as shown in FIG. 7, configured to engage the sliding arcs (20 a) and (20 b) and the rotor (10). The spring means (21) further configured to offset centrifugal force generated by the rotation of the rotor (10) applied to the sliding arcs (20 a) and (20 b).

Figure 8:
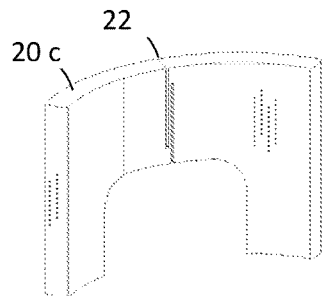

A sliding arc (20 c) as shown in FIG. 8, further includes proper spring means (22) to alter said sliding arc (20 c) overall length and further to avoid jamming against floating fragments.

Figure 9:
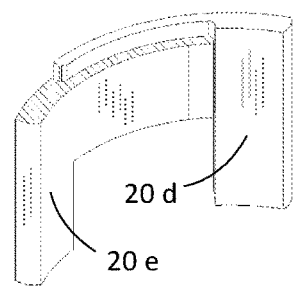

A sliding arc as shown in FIG. 9, further configured in two parts (20 d) and (20 e) to maintain engagement with an engaging housing in the event of said sliding arc parts (20 d) and (20 e) material loss.

Figure 10:
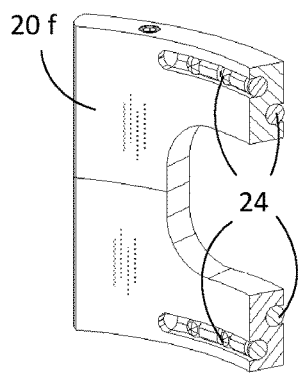
Figure 14:
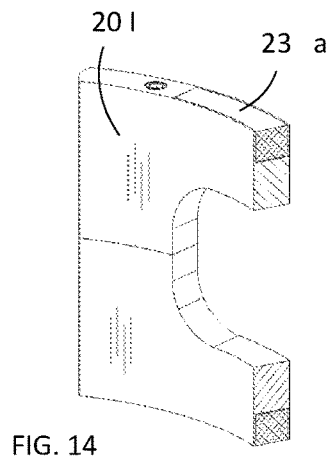
Figure 15:
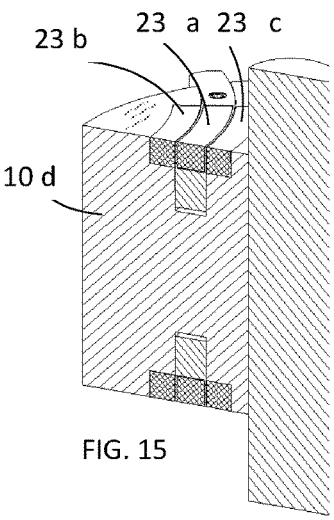

A sliding arc (20 f) as partially shown in FIGS. 10, 14-15, further includes proper sliding enhancement means including oil-bearing, ball bearing, roller bearing, magnetic bearing, and air bearing.

Figure 11:
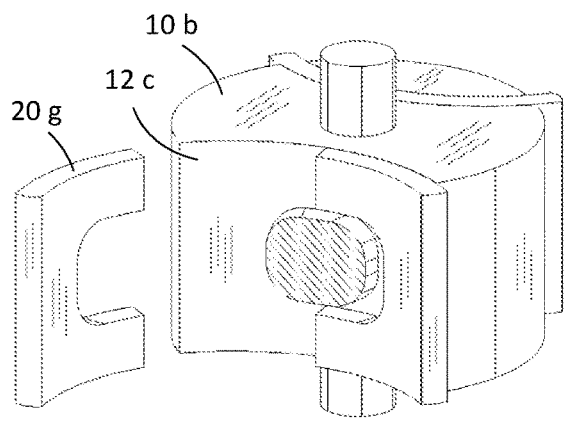

A sliding arc (20 g), as shown in FIG. 11, further configured to engage a rotor (10 b) sliding channel (12 c) from the perimeter side of the rotor (10 b).

Figure 12:
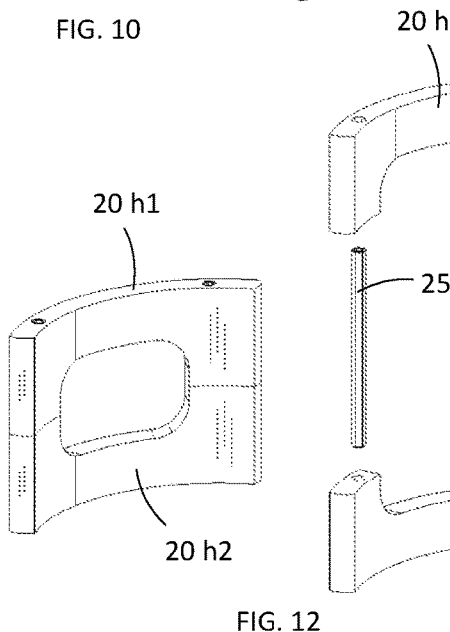
Figure 13:
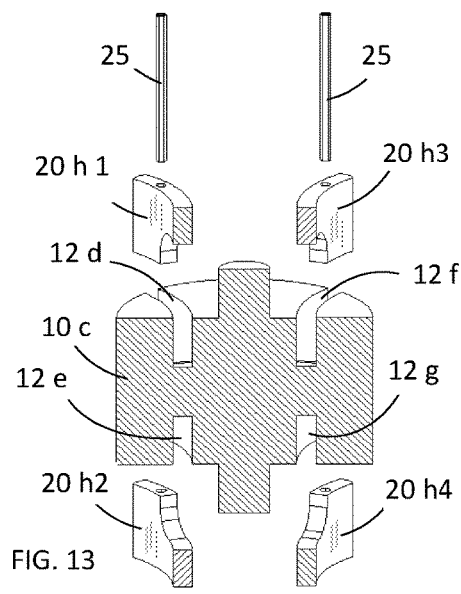

Four sliding arcs (20 h1), (20 h2), (20 h3), and (20 h4) as shown in FIG. 13, further configured to engage a rotor (10 c) sliding channels (12d), (12e), (12f) and (12 g) from both ends of the rotor (10 c). Proper joint means including a pair of pins (25) as shown in FIG. 12, are to join the sliding arcs (20 h1) and (20 h2).

A sliding arc (20 I) as shown in FIGS. 14-15, further includes proper magnets (23 a) properly attached to the sliding arc (20 I), and the engaging rotor (10 d) further includes proper magnets (23 b) and (23 c) properly attached to the rotor (10 e). The magnets (23 a), (23 b), and (23 c), further configured to repel one another and avoid friction between the sliding arc (20 I) and the rotor (10 d).

Figure 16:
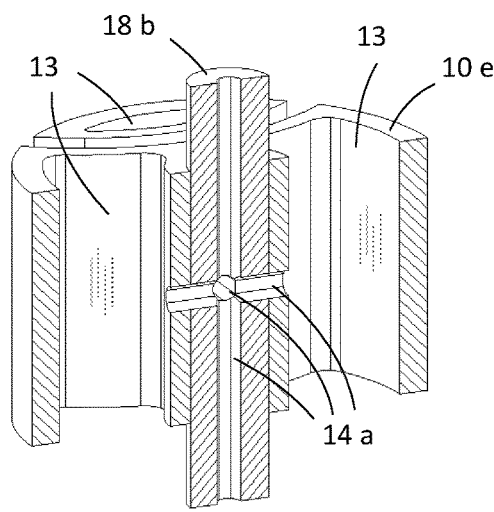

A rotor (10 e) as shown in FIG. 16, further includes proper hollow means (13) for one or more purposes including reduction of the rotor's (10 e) overall weight, to alter the rotor's (10 e) temperature, and to allow storage of proper content within the hollows (13). A shaft (18 b) engaging the rotor (10 e) further includes proper passage (14 a) to allow proper content flow into and flow out of the hollow (13).

Figure 17:
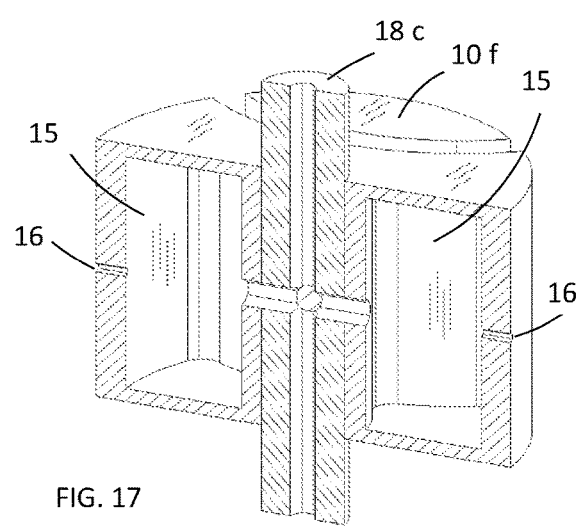

A rotor (10 f) as shown in FIG. 17, further includes proper storage means (15) to allow storage of proper content within the storage (15). Proper passage (14 b) within the engaging shaft (18 c) further configured to deliver proper flow within the storage (15). The storage (15) further includes proper outlet (16) to allow flow out of said storage (15).

Figure 18:
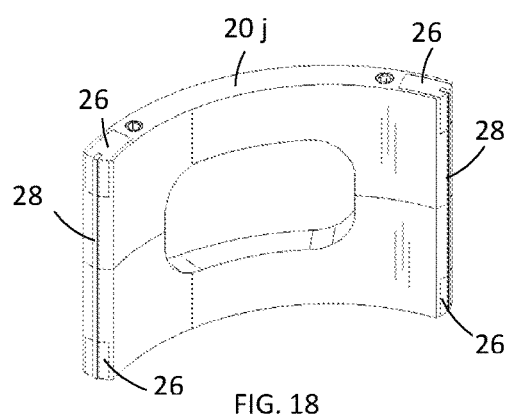

A sliding arc (20 j) as shown in FIG. 18, further includes proper magnets (26) at both ends.

Figure 19:
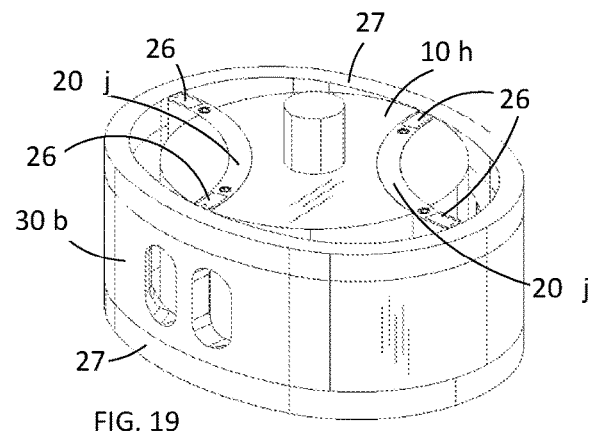

An engaging housing (30 b) as shown in FIG. 19, further includes at least one elliptical magnet (27) aligned with the housing (30 b). The magnet (26) of the sliding arc (20 I) and the magnet (27) of said housing (30 b) further configured to repel one another and avoid friction between the sliding arc (20 I) and the housing (30 b).

A sliding arc (20 I) as shown in FIG. 18, further includes proper seals (28) at both ends. The seals (28) are to prevent leakage from one rotating chamber to another rotating chamber.

Two sliding arcs (20 k) and (20 L) as shown in FIG. 21, further joined by proper joint means (20 m). The sliding arcs (20 k) and (20 L), joined by proper join means (20 m), collectively forming a two-unit sliding arc (20 n). One said unit (20 k) further includes proper magnets (26) at both ends repel the engaging housing magnet (27) as shown in FIG. 22, and further to prevent friction between the other sliding arc (20 L) and engaging housing (30 c) as shown in FIG. 24. The sliding arc (20 n) as shown in FIG. 21, further includes proper join (25) and proper seals (28).

A second two-unit sliding arc (20 n) as shown in FIG. 20, further configured to join the first two-unit (20 n) by proper join means including a pair of pins (25) and collectively forming a three-unit sliding arc (20 o).

A pair of the three-units sliding arcs (20 o) as shown in FIG. 20, a pair of elliptical magnets (27) as shown in FIG. 22, three engaging rotors (10 I), (10 j) and (10 k) as shown in FIG. 23, a housing (30 c) as shown in FIG. 24, and a pair of thermal insulators (33) as shown in FIG. 25, collectively forming a three-units set as shown in FIG. 24. The thermal insulator (33) further to prevent heat from one said unit affecting another said unit.

FIG. 26, shows a cutoff portion of the thermal insulator (33) and a cutoff portion of the joint (20 m) and further illustrating the reciprocating limitation of the joint (20 m) within the thermal insulator (33) opening (33 a).

The sliding arc (20 o) as shown in FIG. 27, engaging the housing (30 c) friction-free as the seals (28) contacting the housing (30 c).

An arc turbine system in accordance with the principles of the present invention further configured to generate rotating energy by igniting proper fuel in more than one configuration.

Figure 28:
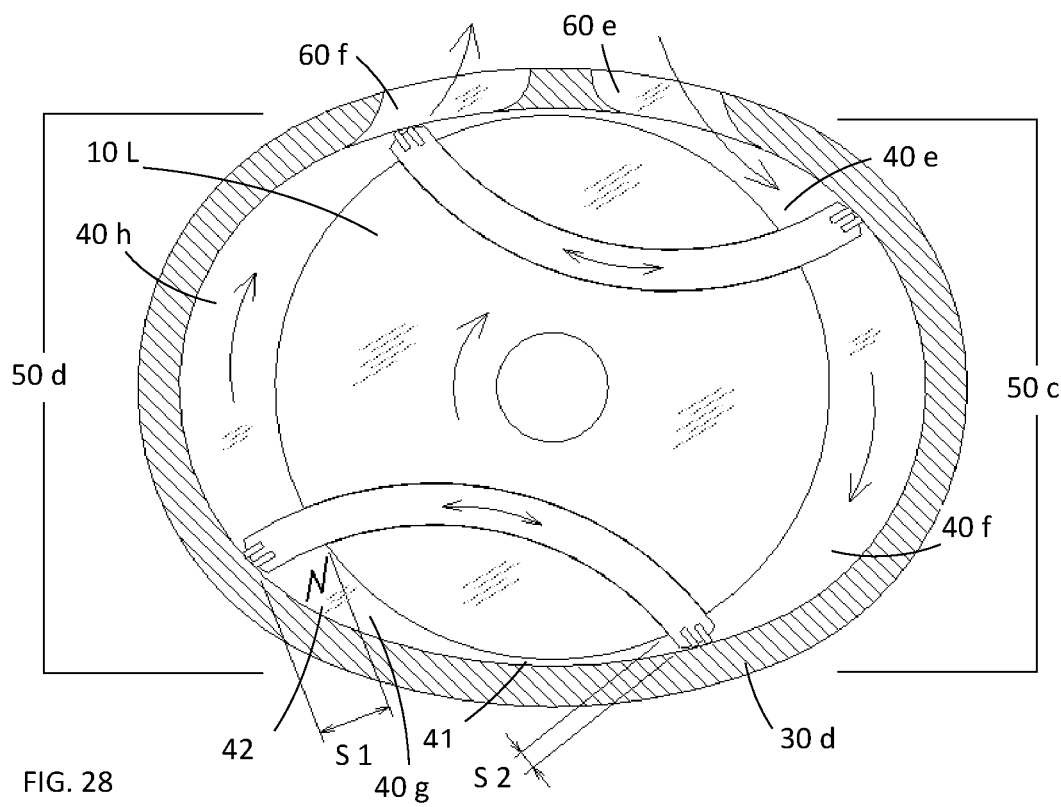

An arc turbine power generator as shown in FIG. 28, allows suction, compression, expansion, and exhaust to occur in all four rotating chambers (40 e), (40 f), (40 g), and (40 h) in every rotation for the total of four expansion force per rotation.

Fuel entered the first static chamber (50 c) through a proper intake port (60 e) as the four rotating chambers (40 e), (40 f), (40 g), and (40 h) expanding within the static chamber (50 c). The four rotating chambers (40 e), (40 f), (40 g), and (40 h) further compress and convey the fuel through a proper passage (41) into the second static chamber (50 d). The compressed fuel further ignited by proper ignition or under proper pressure at proper timing (42) and the generated expansion force applied to both surfaces of (S 1) and (S 2) of the engaging sliding arcs as one surface (S 1) expanding and one surface (S 2) retracting. Said surface area difference, increases pressure on surface (S 1) as decreasing pressure on surface (S 2) forcing the rotor (10 L) to rotate on the dominating surface area direction of (S 1).

Figure 29:
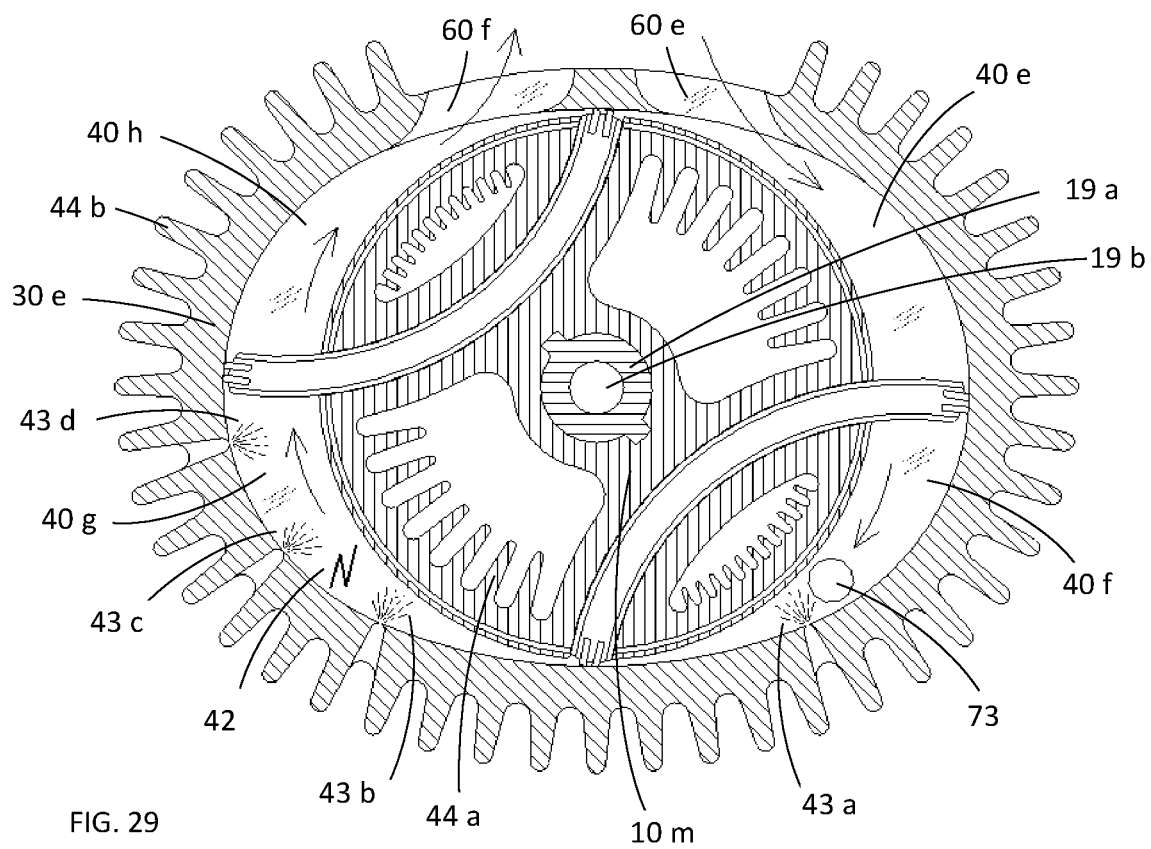

Additional fuel as shown in FIG. 29, further brought into one or both static chambers (50 c) and (50 d) by one or more proper injectors as shown the example of (43 a), (43 b), (43 c), and (43 d) to boost power.

Figure 32:
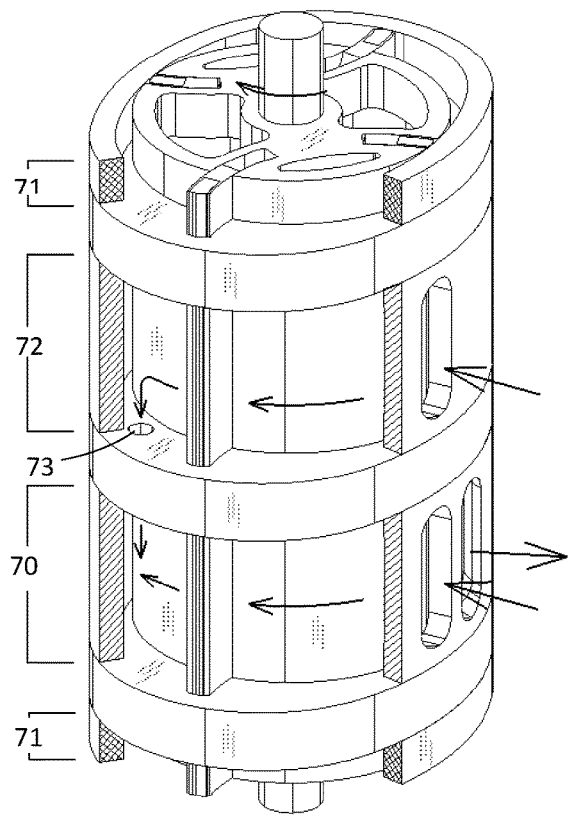
FIG. 32, shows an assembly of a power generator, and an aligned air compressor.

An arc turbine system air compressor (72) shown in FIG. 32, aligned with an arc turbine power generator (70), further configured to supply additional flow (73) within at least one said power generator (70) static chambers to increase compression.

A proper flow regulator (not shown) further utilized to regulate the amount of content flow into one or both static chambers to adjust the compression ratio.

A rotor (10 m) as shown in FIG. 29, further includes proper cooling means (44 a) configured to cool the rotor (10 m) and related components from inside.

A housing (30 e) as shown in FIG. 29, further includes proper cooling means (44 b) configured to cool the housing (30 e) and related components from outside. Other proper cooling means including oil and water may further configured to cool an arc turbine power generator.

Figure 30:
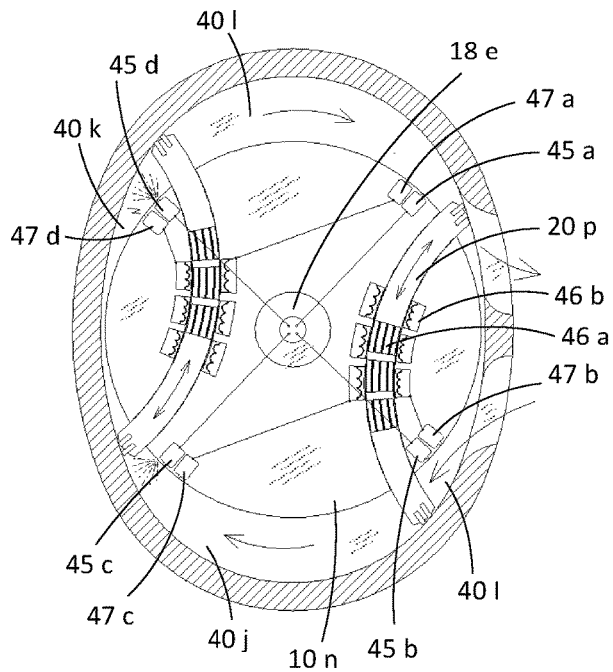

Fuel as shown in FIG. 30, further brought into the four rotating chambers (40 i), (40 j), (40 k), and (40 l) through an engaging shaft (18 e) and engaging rotor (10 n). The fuel enters via proper fuel injector means (45a, 45b, 45c, 45d) in the engaging rotor (10 n).

A proper electric generator, as shown in FIG. 30, further configured to generate electricity by reciprocating motion of an engaging sliding arc (20 P), against an engaging rotor (10n), to generate electricity is used to power means including components configured to monitor the system and further to power means configured to ignite fuel within said four rotating chambers (40 I), (40 j), (40 k), and (40 L) by proper ignition means (47 a), (47 b), (47 c) and (47 d) placed on the rotor (10 n).

Figure 31:
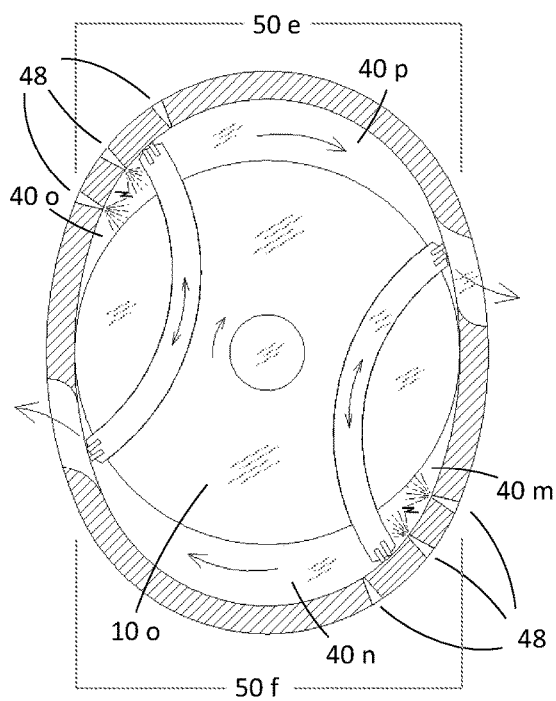
FIG. 31, shows injection of pressurized fuel simultaneously within both static chambers.

Fuel as shown in FIG. 31, further brought into both static chambers (50 e) and (50 f) via proper fuel injector means (48) simultaneously, ignited by proper ignition means or under proper pressure and the generated expansion forces applied to said four rotating chambers (40 m), (40 n), (40 o) and (40 p) simultaneously in both static chambers (50 e) and (50 f) to increase power.

Exhaust force from an exhaust port further utilized to rotate a rotor in one static chamber and allow suction, compression and expel of flow within the other static chamber to generate turbocharging.

Proper seal means further put in place to seal parts and components of an arc turbine system as required.

Proper enclosure means further configured to accommodate all parts and components of the arc turbine system.

The particular embodiments disclosed above are illustrative only, as the embodiments may be modified and practiced in different but equivalent manners apparent to those skilled in the art of having the benefit of the teachings herein. It is therefore clear that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

Figure 33:
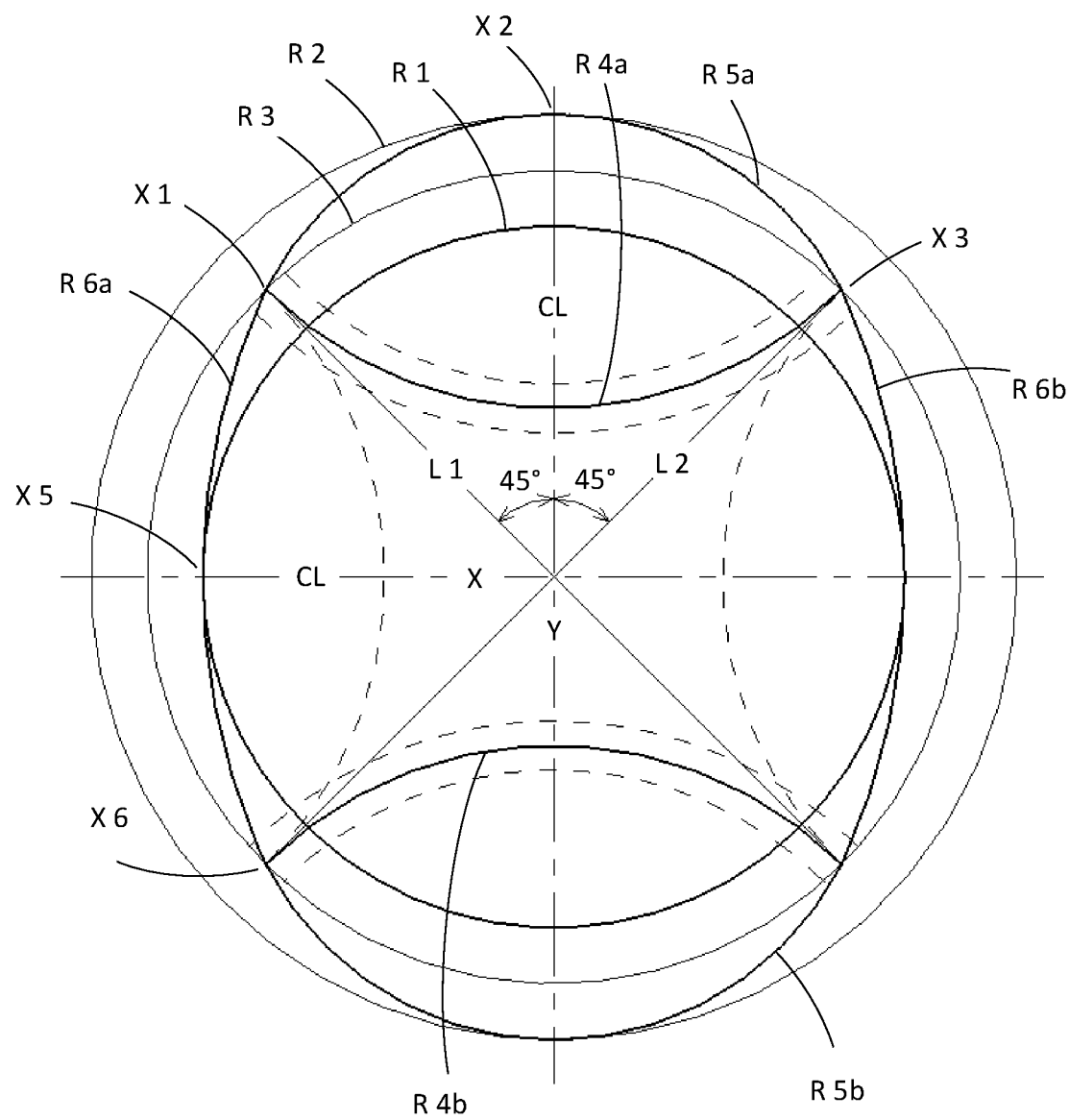
FIG. 33, shows a configuration method of all the engaging arcs.

A geometry configuration method of the arcs of an arc turbine system based on a rotor radius (R 1) and an elliptical housing long-axis (R 2) as shown in FIG. 33, includes:

[R3=(R1)+(R2)÷2], [(R4 *a*)=(R3) tangential to (L1) and (L2)], [(R4*b*)=(R4*a*) mirrored to the (X) axis], [(R5*a*) is a 3-points arc connecting (X1), (X2) and (X3)], [(R5*b*)=(R5*a*) mirrored to the (Y) axis], [(R6*a*) is a 3-points arc tangential to (R5*a*), (R) and (R5*b*)], [(R6*b*)=(R6*a*) mirrored to (Y) axis].

What is claimed is:

1. An arc turbine system, comprising:
an elliptical housing,
a rotor,
two sliding arcs disposed within the elliptical housing and slide therein;
the rotor includes two sliding means configured to accommodate said two sliding arcs and reciprocate within;
the elliptical housing and the rotor collectively form two static chambers, a first static chamber between the rotor and the elliptical housing first long-axis and a second static chamber between the rotor and the elliptical housing second long-axis;
the first static chamber includes at least one inlet and the second static chamber includes at least one outlet;
the two sliding arcs engaging the elliptical housing simultaneously at both ends and together with the elliptical housing and the rotor collectively form four rotating chambers of variable capacity within the first static chamber and the second static chamber; and
at least one sliding arc of the two sliding arcs includes at least one magnet at both ends and wherein the elliptical housing further includes at least one elliptically oriented magnet aligned with said elliptical housing, the magnets of the sliding arcs and the magnet of the elliptical housing are to repel and avoid friction between the sliding arcs and the elliptical housing.

2. The arc turbine system of claim 1, wherein the two sliding arcs are each configured as two units, a first unit and a second unit joined by proper join means;
wherein only the first unit includes the at least one magnet at both ends and together with the elliptically orientated magnet located in at least the first unit provides proper distance from the elliptical housing to avoid heat from the elliptical housing reaching the magnets, as well as, avoids friction between each of the two sliding arcs located in the second unit sliding within the elliptical housing.

3. The arc turbine system of claim 1, further includes proper thermal insulator means to prevent heat from the elliptical housing reaching the at least one magnet.

4. The arc turbine system of claim 1, wherein at least one of the two sliding arcs further includes a spring to alter the respective at least one of the two sliding arc's overall length.

5. The arc turbine system of claim 1, wherein at least one of the two sliding arcs is split lengthwise to reduce centrifugal force of said at least one of the two sliding arcs engaging the elliptical housing.

6. The arc turbine system of claim 1, wherein at least one of the two sliding arcs further includes at least one seal at both ends of the respective at least one of the two sliding arcs to avoid leakage between adjacent rotating chambers of the four rotating chambers.

7. The arc turbine system of claim 1, wherein the rotor further includes proper cooling means configured to air-cool the rotor from inside.

8. The arc turbine system of claim 1, wherein at least one of the two sliding arcs and the rotor further include at least one spring means that offsets the centrifugal force generated by said rotor applied to the at least one of the two sliding arcs.

9. The arc turbine system of claim 1, wherein the rotor further includes at least one storage means to allow proper contents stored within said at least one storage means.

10. The arc turbine system of claim 1, wherein at least one of the two sliding arcs and the rotor further includes at least one electric generator module that generates electricity by reciprocating motion of the at least one of the two sliding arcs within the rotor; and
wherein the electricity generated powers at least one of a monitoring system or an ignition system.

11. The arc turbine system of claim 1, wherein at least one of the two sliding arcs further includes an additional magnet attached between the ends of said at least one of the two sliding arcs and the rotor includes magnets at both sides of said at least one of the two sliding arcs with the additional magnet;
wherein the additional magnet attached to said at least one of the two sliding arcs is repelled by the magnets in the rotor to avoid friction between said at least one of the two sliding arcs and the rotor.

12. The arc turbine system of claim 1, wherein the arc turbine system is an arc turbine power generator system;
the four rotating chambers compress and convey their contents through a proper passage into the second static chamber as said contents ignited by proper ignition means or under proper pressure at proper timing and the generated combustion force applied to two surfaces of the engaging sliding arcs of the two sliding arcs as one surface expanding and the other surface retracting, said surface area disparity forces the rotor to rotate on the dominating surface area direction.

13. The arc turbine system of claim 12, wherein at least one of the first static chamber and the second static chamber includes a fuel injector means to inject fuel within the respective at least one of the first static chamber or the second static chamber.

14. The arc turbine system of claim 12, wherein at least one of the first static chamber or the second static chamber further includes at least one second inlet to allow additional flow means into the at least one of the first static chamber or the second static chamber to increase compression.

15. The arc turbine system of claim 12, wherein the first static chamber and the second static chamber allow contents to flow into at least one of said first or second static chambers through the rotor and an engaging shaft.

16. The arc turbine system of claim 12, wherein at least one of the first static chamber and the second static chamber receives fuel to boost power.

17. The arc turbine system of claim 12, wherein the rotor has a passage to allow fuel to enter at least one of the four rotating chambers through the rotor to boost power.

18. The arc turbine system of claim 1, wherein the arc turbine system handles gas and/or liquid;
the first static chamber includes the at least one inlet and at least one outlet, and the second static chamber includes at least one inlet and the at least one outlet;
wherein the arc turbine system allows liquid or gas to enter the at least one inlet in the first static chamber and the second static chamber and exit from the at least one outlet of the respective first static chamber and the second static chamber.

19. The arc turbine system of claim 18, wherein at least one of the first static chamber and the second static chamber allows pressurized flow to enter the at least one of said first or second static chambers to rotate the rotor.

20. The arc turbine system of claim 18, wherein at least one of the first static chamber and the second static chamber allows fuel to enter said at least one of the first static chamber and the second static chamber, said fuel igniting and the combustion force rotating the rotor.

* * * * *